Patented July 7, 1953

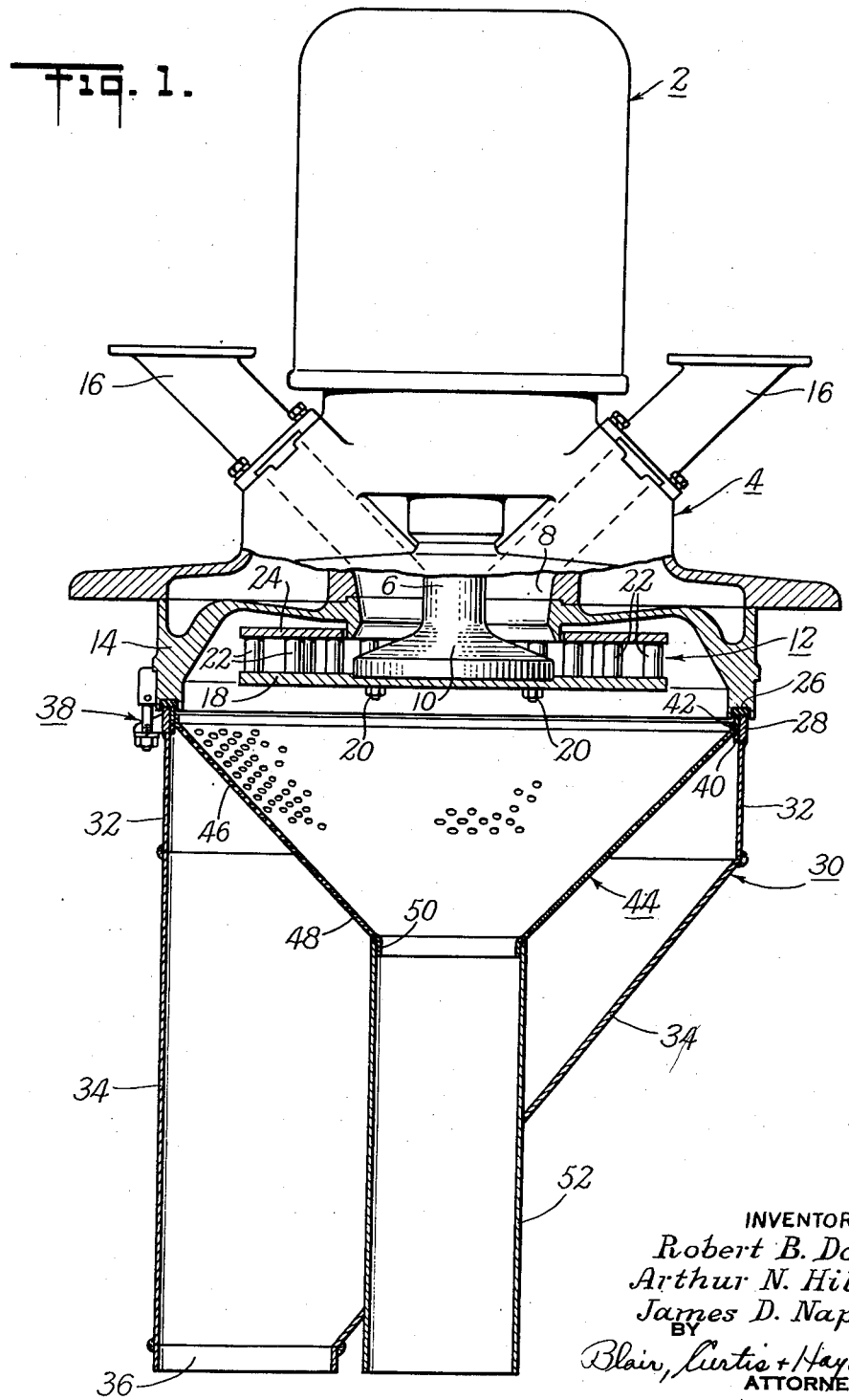

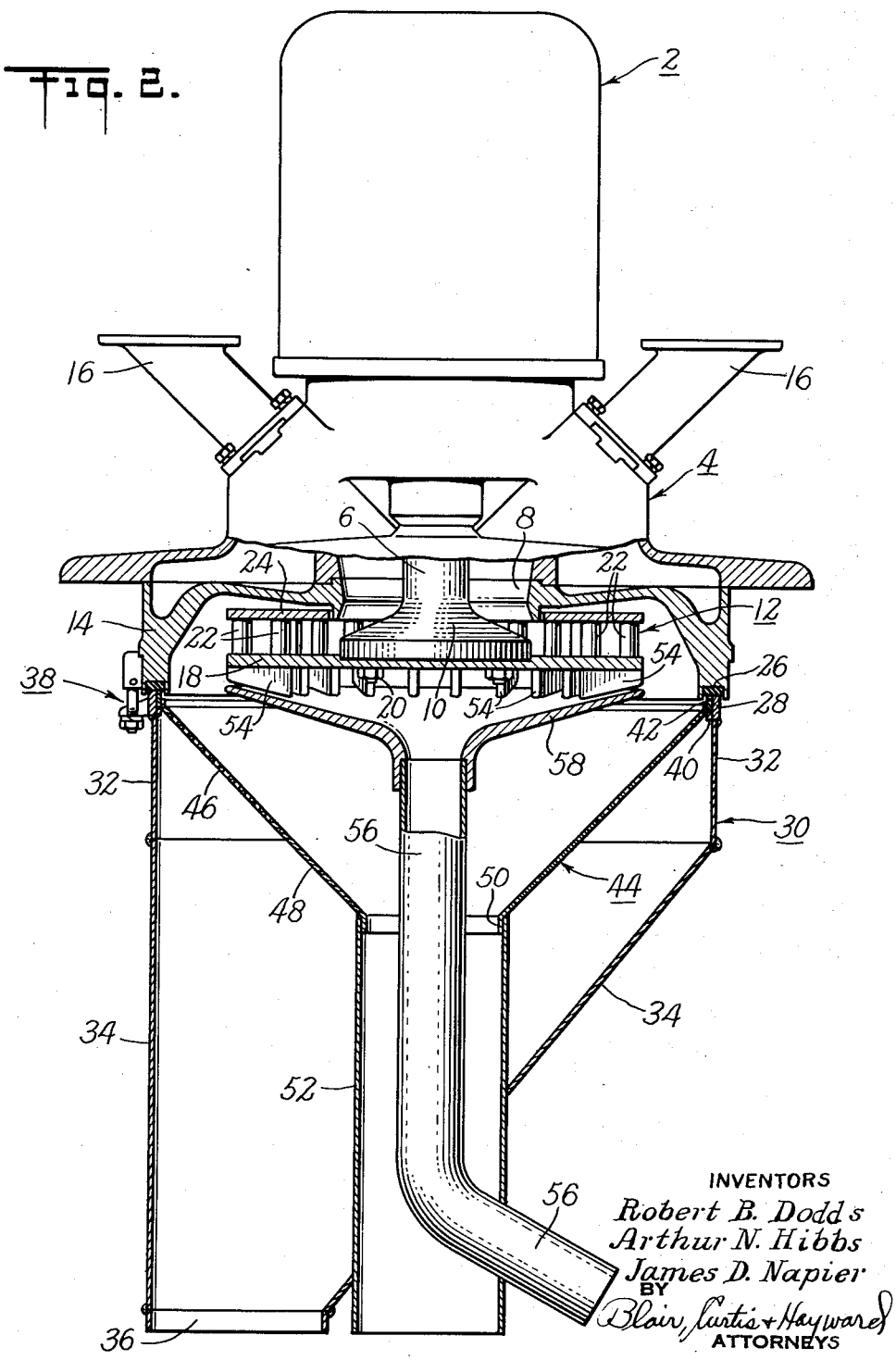

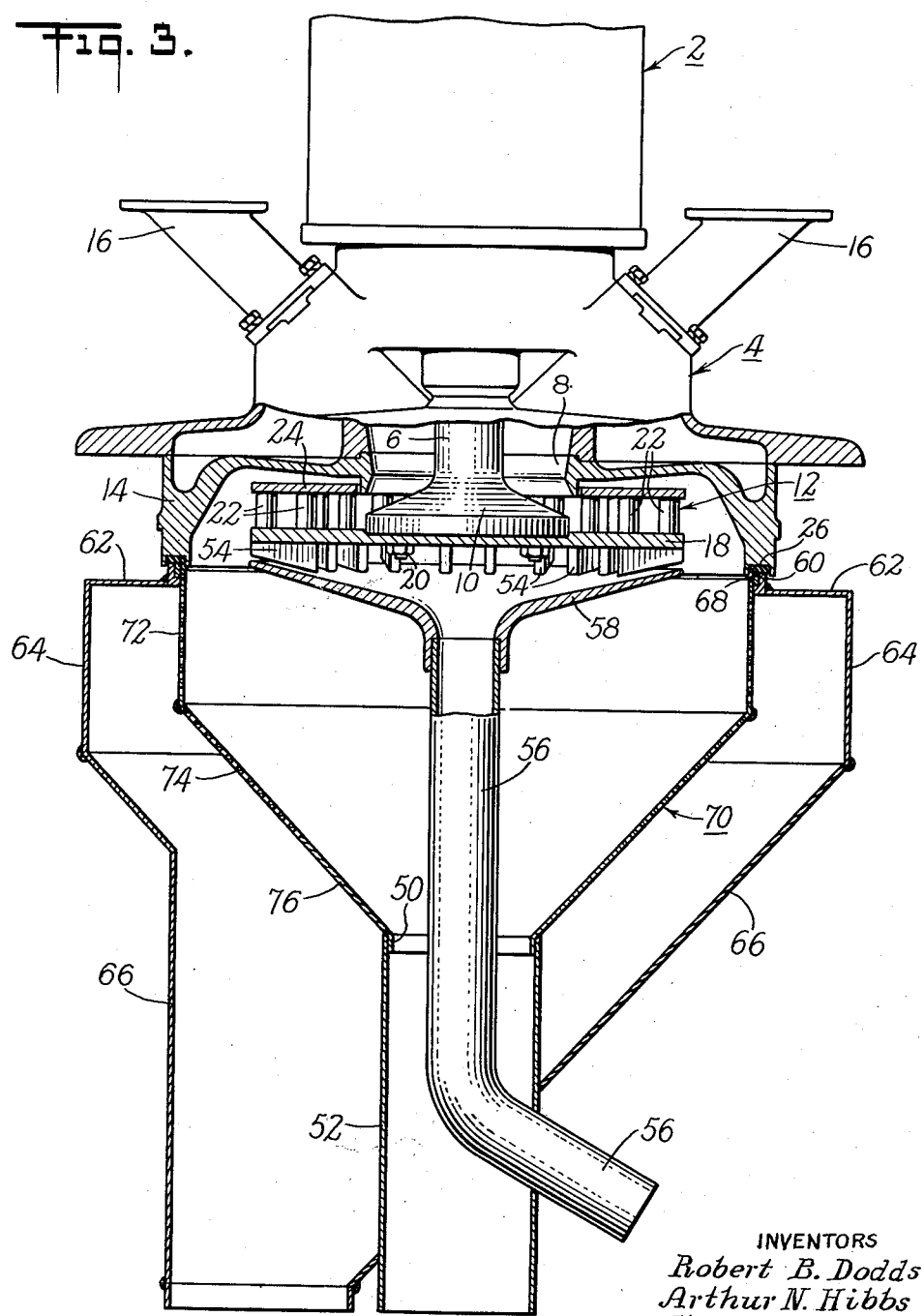

2,644,740

UNITED STATES PATENT OFFICE 2,644,740

METHOD AND APPARATUS FOR TREATING PRODUCTS, INCLUDING DESTROYING INSECT LIFE, DISINTEGRATING, CLEANING, AND SEPARATING

Robert B. Dodds, Woodbridge, Arthur N. Hibbs, Mount Carmel, and James D. Napier, Hamden, Conn., assignors to The Safety Car Heating and Lighting Company, Inc., a corporation of Delaware Application October 4, 1948, Serial No. 52,756

14 Claims. (Cl. 21—2)

This invention relates to centrifugal apparatus and methods of processing flowable materials. More particularly, this invention relates to the separation of materials by centrifugal action; and this separation may be accompanied by an impacting action which is effective to cause comminution of certain products or to knock loose constituent parts, and with food products the impacting action may be effective to destroy insect life.

An object of this invention is to provide an improved method and apparatus for treating products to remove certain materials, constituents or parts therefrom. A further object is to provide a method and apparatus for subjecting a product to a preliminary treatment, such as, the destruction of insect life therein or the knocking loose of product particles; and, then to follow this preliminary treatment by a separating action wherein the major portion of a certain constituent or certain constituents, or particles of a particular size, are removed from the product. A further object is to provide an improved manner of treatment of a product, such as, bran or shorts or buckwheat hulls, to remove endosperm particles or the like therefrom. A further object is to provide an improved method and apparatus for "whizzing" cereals such as wheat and corn.

A further object is to provide for the above with the additional feature that any insect life in the product is destroyed during the operation. A further object is to provide apparatus for carrying out the above which is simple and sturdy in construction, economical to manufacture, operate and maintain, and extremely reliable and efficient in use. A further object is to provide for the carrying on of the above operations in a continuous manner so that a thorough and uniform treatment is provided. These and other objects will be in part obvious and in part pointed out below.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the drawings:

Figure 1 is a view partially in section showing one embodiment of the invention; and, Figures 2 and 3 are views showing another embodiment of the invention.

The present invention relates to the invention covered by U. S. Patent No. 2,339,737, and also to the invention disclosed in the co-pending application of Robert B. Dodds, Serial No. 781,130, filed October 21, 1947, now Patent No. 2,529,679.

In Patent No. 2,339,737 there is disclosed a method and apparatus for treating bulk products for the destruction of all insect life therein. A portion of the apparatus of the illustrative embodiments of the present invention is the same as the apparatus disclosed in this patent. In Patent No. 2,529,679 an arrangement is disclosed whereby bulk products may be treated by apparatus such as that of Patent No. 2,339,737 so as to dislodge certain constituents of the product, and then the product is subjected to an aspirating action to separate out certain of the constituents.

The present invention is directed primarily to the separation of certain constituents from others by centrifugal action and particularly by providing an arrangement which produces a whirling action in a perforated annular wall with the result that certain constituent particles pass through the perforations into an outer zone, whereas the remainder of the particles are confined within the perforated wall. The rotation of the product is obtained by passing a stream of the product through a rotor with an accompanying stream of air so as to produce a cyclone action. The rotor construction and its speed of rotation may be such as to break or knock loose constituent particles, thus to obtain somewhat of a milling or comminuting action and with appropriate products the rotor may produce an impacting action sufficient to kill any insect life which is present.

In the illustrative embodiments of the present invention provision is made to treat food products such as cereals, grains and seeds and their constituent products, and in each of these instances the action is such that all insect life in the product is destroyed. The insect destruction is obtained by impacting actions which are produced within the treatment zone and there is a simultaneous breaking up of product constituents, or constituent particles may be knocked loose without substantial breaking up of the various constituent particles. Under some circumstances the impacting action may be extremely light, or it may be eliminated completely, with the result that the effect of the rotor is merely to produce a rapidly rotating stream of the product and the accompanying air.

The action at the rotor is followed by the separating action referred to above with there being a whirling stream of air in the nature of a cyclone or vortex which is confined by a perforated wall which may be wholly or may be partially either cylindrical or frusto-conical. In the zone of discharge from the rotor the stream of the product is accompanied by a sufficient quantity of air to carry the product somewhat in suspension; the cyclone effect tends to throw the product particles from the air against the perforated wall, but the air continues to whirl with the result that the product particles are carried with it and slide and tumble around the perforated wall. The major portion of the air passes through the perforations in the wall and the smaller sized particles pass through the perforations by the combined action of the centrifugal forces resulting from the rotary movement and the flow of the air.

In accordance with certain of the broader aspects of the present invention products such as wheat or corn may be given a preliminary treatment by water, and the water may then be removed by passing the stream through a centrifugal machine with the air and water passing through the perforations in a screen and with the wheat or corn passing down the screen. In accordance with certain other broad aspects of the invention the insect-destroying feature referred to above is unimportant, and therefore, the impacting action may be eliminated or it may be only of such a nature as to produce the desired knocking loose or breaking up of the product; thus under some circumstances the apparatus may be mainly for separating certain constituents or particles smaller than a certain size from others. With the separating arrangement of the present invention the amount of the product which is separated from the main stream is determined mainly by the size of the openings in the perforated wall, but it is also determined to some extent by the amount of air which accompanies the stream of the product. Thus, for each specific application of the present invention the various features of construction and operation of the apparatus are such as will give the best results. Many of the factors which determine the specific structure and mode of operation for the various applications are discussed in detail herein whereas more obvious ones are not discussed.

Referring particularly to Figure 1 of the drawings there is shown at the top an electric motor 2 mounted on the top of a casing structure 4 and having a shaft 6 which projects through an opening 8 in the top of the casing structure and has keyed at its lower end a hub 10 of a rotor 12. This motor and casing and rotor structure is the same as the corresponding structure in the above-identified patent. The casing structure 4 has a downwardly extending peripheral flange portion or shell 14 and at the two sides of the motor there are product inlet spouts 16. Rotor 12 is formed by a bottom plate 18 which is secured to hub 10 by a plurality of studs and nuts 20, and this plate carries a double row of cylindrical impactors 22 which in turn carry an upper annular plate 24.

The lower edge of shell 14 has a groove 26 which is substantially filled by a rubber ring and pressing against this rubber ring is the top flange 28 of a hopper structure 30 which includes a cylindrical upper section 32 and a non-symmetrical hopper 34 which has a product outlet spout 36 at the left. The hopper structure is supported by a plurality of swinging bolt and nut assemblies 38 which are attached to shell 14 and provide a removable supporting means for the hopper structure. Positioned on the inside of top flange 28 at the lower edge thereof and welded thereto is a ring 40 which provides a supporting ledge for a similar ring 42 which is the top flange on a perforated hopper 44. Hopper 44 is formed by an upper annular wall 46 of perforated sheet metal and a lower annular wall 48 which is of imperforate sheet metal. These walls are both frusto-conical and they are brazed together to form a continuous frusto-conical wall which is brazed at the top to ring 42. At the bottom wall 48 has a collar 50 which fits within a chute 52 which projects downwardly through the wall of hopper 34. Thus the perforated hopper 44 is removably supported at its top and bottom and it may be removed and replaced readily by merely dropping the hopper structure 30 and the connecting chutes.

With this arrangement a product such as bran passes into the top of the casing structure 4 through the inlet chutes 16 and it is passed through the rotor with an accompanying stream of air in the manner described in detail in Patent No. 2,339,737. During the passage through the rotor the stream of the product is spread out and its rate of movement is increased so that it is in a fairly thin stream with the result that the product particles are thoroughly treated. The action is such that al insect life which may be present is destroyed, and at the same time particles of endosperm are knocked loose from the bran particles. The product is discharged at a rapid rate at the periphery of the rotor and is directed downwardly by shell 14 so that it tends to cause a cyclone or vortex within the perforated hopper 44. Chute 52 being connected in the mill stream, is restricted so that air is not discharged through it in any substantial amount, whereas chute 36 is open in the sense that air may discharge through it. Accordingly the air which accompanies the product at the periphery of the rotor tends to pass through the perforations in wall 46. At the same time the rotary movement of the air and the product tends to throw the product particles from the air against wall 46 and the product particles slide and tumble around this wall at a rapid rate. The combined action of centrifugal forces and the flow of air through the perforations in wall 46 causes the particles of endosperm to pass through these perforations while the bran particles are confined by wall 46. Thus the endosperm is separated out and is discharged at 36, whereas the bran passes downwardly through chute 52.

The action within the rotor is such that the bran particles are not reduced to any material extent and wall 46 has perforations of such size as to permit the passage of the endosperm particles which are in this embodiment in the nature of dust. The natural air pressure of rotor 12 when operating at 3500 R. P. M. is sufficient to produce the desired air flow. In one installation the perforations in wall 46 were .045 inch in minor dimension, and in another instance this dimension was .078 inch. Under some circumstances wire mesh has been used.

The apparatus of Figure 1 has proved satisfactory for separating endosperm from bran and from shorts, and also for separating endosperm from buckwheat hulls, it being understood that appropriate perforation sizes are used to remove particles of the desired sizes.

In Figure 2 there is shown on a reduced scale an arrangement similar to that of Figure 1 with the addition of means to increase the air flow through the separating zone. Accordingly fixed to the bottom of rotor 12 is a set of air impeller blades or vanes 54 and centrally positioned within chute 52 is an air inlet tube 56. Tube 56 carries at its upper end a frusto-conical baffle 58 which is stationary and which forms with the bottom of rotor 12 an annular radial passageway for air. Thus during the rotation of the rotor air is drawn in through tube 56 and passes upwardly and is directed radially outwardly by vanes 54. This stream of air is added to the stream of air which accompanies the product through the rotor and is discharged through the perforations in wall 46 and outlet 36. The effect of this added air is to increase materially the tendency for product particles to pass through the perforations and therefore a very thorough separation is obtained even though a very substantial portion of the stream is being separated off through the perforations.

Figure 3 is similar to Figure 2 but shows a form of the invention wherein additional space is provided for the discharge of the air and the separated particles. In Figure 3 a ring 60 replaces flange 28 and carries a cylindrical shell formed by an annular top wall 62 and a downwardly extending cylindrical wall 64. This shell has a hopper bottom 66 with a product outlet opening at the bottom. Ring 60 has a ledge portion which supports a ring 68 of a perforated hopper structure 70. The perforated hopper structure includes an upper cylindrical perforated wall portion 72, a frusto-conical perforated wall portion 74, and an imperforate frusto-conical wall portion 76, all brazed together to form a rigid structure. The operation in the embodiment of Figure 3 is similar to that of the other embodiments except that a larger discharge zone is provided around the perforated hopper structure and the upper portion of the perforated wall is cylindrical rather than frusto-conical. Thus for certain conditions of operation improved results are obtained with this construction.

As indicated above the apparatus herein disclosed is adaptable for use in "whizzing" grain and for other operations wherein a thorough and rapid separation is required. When no milling action is necessary or desired the rotor structure may be modified and the rate of rotation may be reduced. Similarly when no insect destruction is necessary the structure and operation may be modified accordingly. The structure is admirably suited for carrying on reducing operations in the milling of wheat, in the processing of corn and in the milling of granular products of various kinds. For some operations impactors 22 are replaced by blades, and under some circumstances hub 10 is of reduced thickness so as to permit a freer flow of the product, outwardly toward the impactors.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

We claim:

1. In apparatus for treating a bulk product, the combination of, a rotor defining an annular treatment zone through which the product flows to impart rotary movement thereto, a downwardly extending casing construction surrounding said rotor and defining at the periphery of the rotor a discharge zone having an impact surface against which the rotating stream of the product passes and means forming a pair of separation hoppers beneath said zone and connected thereto, said means including a separating wall member having openings therethrough and separating the upper portions of the hoppers directly adjacent and below said discharge zone whereby the rotating annular stream of the product passes along said separating wall with the smaller particles passing through said openings and with the larger particles passing downwardly along said wall.

2. Apparatus as described in claim 1 wherein said separating wall is a frusto-conical wall extending downwardly and radially inwardly.

3. Apparatus as described in claim 1 wherein said separating wall is formed by a cylindrical wall portion having at its lower edge a frusto-conical wall portion which extends downwardly and radially inwardly.

4. Apparatus as described in claim 1 which includes air impelling means mounted on said rotor to direct a stream of air into the stream of the product as the product passes from said rotor.

5. Apparatus as described in claim 4 wherein said impeller means is in the form of a plurality of vanes mounted on the bottom of said rotor, and an air supply structure mounted beneath said rotor to pass air to said vanes and comprising an annular baffle member and an air conduit connected to the center of said baffle member.

6. Apparatus as described in claim 5 wherein said separation hoppers are in the form of inner and outer hopper structures, said outer hopper having at the top a cylindrical portion which is substantially larger than said casing, said inner hopper structure including at the top a cylindrical perforated wall of substantially the diameter of the periphery of said discharge zone.

7. In apparatus for treating a bulk product, the combination of, a casing, a rotor rotatably mounted in said casing, said rotor having mounted thereon a plurality of product particle engaging members adapted when the product is fed to said rotor to engage the product particles together with any foreign particles in the product stream such as forms of insect life, whereby all of said particles exert substantial centrifugal force, said casing including a wall portion surrounding said rotor against which all of said particles are flung, said rotor accordingly imparting to the stream of particles a high velocity swirling or cyclonic action, a hopper secured to the bottom of said casing in a position to receive said cyclonic stream which accordingly swirls about and against the wall of said hopper together with the entrained air, said hopper having a plurality of small holes formed therein of a size large enough to pass small stream particles and the air, but too small to pass the larger particles, a discharge outlet for said hopper adapted to be connected in the mill stream, and means forming an expansion chamber connected to said casing and surroundig said hopper to receive the small particles and the air passing through said holes.

8. Apparatus according to claim 7, wherein the wall of said hopper is of frustoconical form and extends downwardly and radially inwardly of said casing.

9. Apparatus according to claim 7, wherein the wall of said hopper is of frustoconical form and extends downwardly and radially inwardly of said casing, said holes being formed in the upper portion of said hopper wall only.

10. In apparatus for treating a bulk product, the combination of, a rotor defining an annular treatment zone through which the product flows to impart rotary movement thereto, a downwardly extending casing construction surrounding said rotor and defining at the periphery of the rotor a discharge zone having an impact surface against which the rotating stream of the product passes, and means forming a pair of separation hoppers beneath said zone and connected thereto, the inner of said hoppers including a separating wall member having a plurality of small holes formed in the upper portion thereof of a size large enough to pass small stream particles and the air but too small to pass the larger particles, said separating wall member being located adjacent and below said discharge zone whereby the rotating annular stream of the product passes along said separating wall with the smaller particles passing through said openings and with the larger particles passing downwardly along said wall.

11. Apparatus according to claim 10, wherein the separating wall includes an upper cylindrical portion, and a lower frustoconical portion.

12. In apparatus for treating a bulk product, the combination of, a casing, a high velocity rotor rotatably mounted in said casing, said rotor having mounted thereon a plurality of upwardly extending product particle engaging members adapted when the product is fed to said rotor to engage the product particles together with any foreign particles in the product stream such as forms of insect life, whereby all of said particles exert substantial centrifugal force, said casing including a downwardly and outwardly extending imperforate wall portion surrounding said rotor against which all of said particles are flung, said rotor accordingly imparting to the stream of particles a high velocity swirling or cyclonic action having a downwardly extending component, a hopper secured to the bottom of said casing in a position to receive said cyclonic stream which accordingly swirls about and against the wall of said hopper together with the entrained air, said hopper having a plurality of small holes formed therein of a size large enough to pass small stream particles and the air, but too small to pass the larger particles, a discharge outlet for said hopper adapted too be connected in the mill stream, and means forming an expansion chamber connected to said casing and surrounding said hopper to receive the small particles and the air passing through said holes.

13. Apparatus according to claim 12, wherein the wall of said hopper underlies all portions of said rotor and includes a frustoconical portion which extends downwardly and radially inwardly of said casing.

14. In the art of treating a cereal product such as wheat for the destruction of insect life and for the separation of constituent parts therefrom, the steps of, passing the stream of the product with an accompanying stream of air substantially horizontally through a treatment zone by subjecting the product particles to high velocity centrifugal action, subjecting the product particles to an impacting action during their passage through said treatment zone of sufficient magnitude to destroy and comminute insect life therein, discharging the product stream with the air in a substantially flat thin horizontal whirling high velocity stream, deflecting the stream downwardly while substantially maintaining its angular velocity, converging said stream during its downward movement, subjecting the stream of product to a screening action and at the same time expanding the air laterally of the converging path of movement of the stream whereby there is withdrawn from the downwardly moving stream small constituent particles thereof including the comminuted insect life together with a substantial amount of air, discharging said small particles and comminuted insect life downwardly, and directing the larger particles of the stream downwardly along a predetermined path confined from the path of the withdrawn particles.

ROBERT B. DODDS.
ARTHUR N. HIBBS.
JAMES D. NAPIER.

References Cited in the file of this patent
UNITED STATES PATENTS

| Number | Name | Date |
|---|---|---|
| 2,339,737 | Hulse | Jan. 18, 1944 |
| 2,391,929 | Smith | Jan. 1, 1946 |